(12) United States Patent
Mandai et al.

(10) Patent No.: US 8,243,342 B2
(45) Date of Patent: Aug. 14, 2012

(54) IMAGE PROCESSING DEVICE

(75) Inventors: Hidenobu Mandai, Osaka (JP);
Kazuhisa Yoneda, Osaka (JP); Hiroyuki Nagao, Osaka (JP); Yasushi Nakamura, Osaka (JP); Yoshiya Kinoshita, Osaka (JP); Takashi Kikutani, Osaka (JP); Kazuhiro Matsuyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 563 days.

(21) Appl. No.: 12/491,486

(22) Filed: Jun. 25, 2009

(65) Prior Publication Data

US 2009/0323130 A1    Dec. 31, 2009

(30) Foreign Application Priority Data

Jun. 30, 2008 (JP) .................................. 2008-169935

(51) Int. Cl.
H04N 1/40    (2006.01)
G03G 15/00    (2006.01)
(52) U.S. Cl. ........................................ 358/448; 399/81
(58) Field of Classification Search .................. 358/448; 345/173; 347/152; 271/4.01; 399/81
See application file for complete search history.

(56) References Cited

U.S. PATENT DOCUMENTS

2004/0052544 A1* 3/2004 Hsu et al. ........................ 399/81

FOREIGN PATENT DOCUMENTS

| JP | 10-020738 A | 1/1998 |
| JP | 2002-073254 A | 3/2002 |
| JP | 2002-171372 | 6/2002 |
| JP | 2003-241460 | 8/2003 |
| JP | 2005-227634 | 8/2005 |
| JP | 2005-300871 | 10/2005 |

OTHER PUBLICATIONS

Translation of JP 2003-241460.*

* cited by examiner

Primary Examiner — Charlotte M Baker
Assistant Examiner — Rury Grisham
(74) Attorney, Agent, or Firm — Renner, Otto, Boisselle & Sklar, LLP

(57) ABSTRACT

An image processing device includes a processing section, a load section, an operating section, and a display unit. The processing section performs processing upon sheets of a recording medium. The operating section includes input keys which receive input operation for controlling the processing section, and is disposed over the load section. The display unit displays information corresponding to input operation from the operating section. And the operating section can be freely shifted between a pulled out position in which its input keys are exposed to the exterior, and a storage position in which it is stored internally, and, in the storage position, is disposed below the display unit.

10 Claims, 12 Drawing Sheets

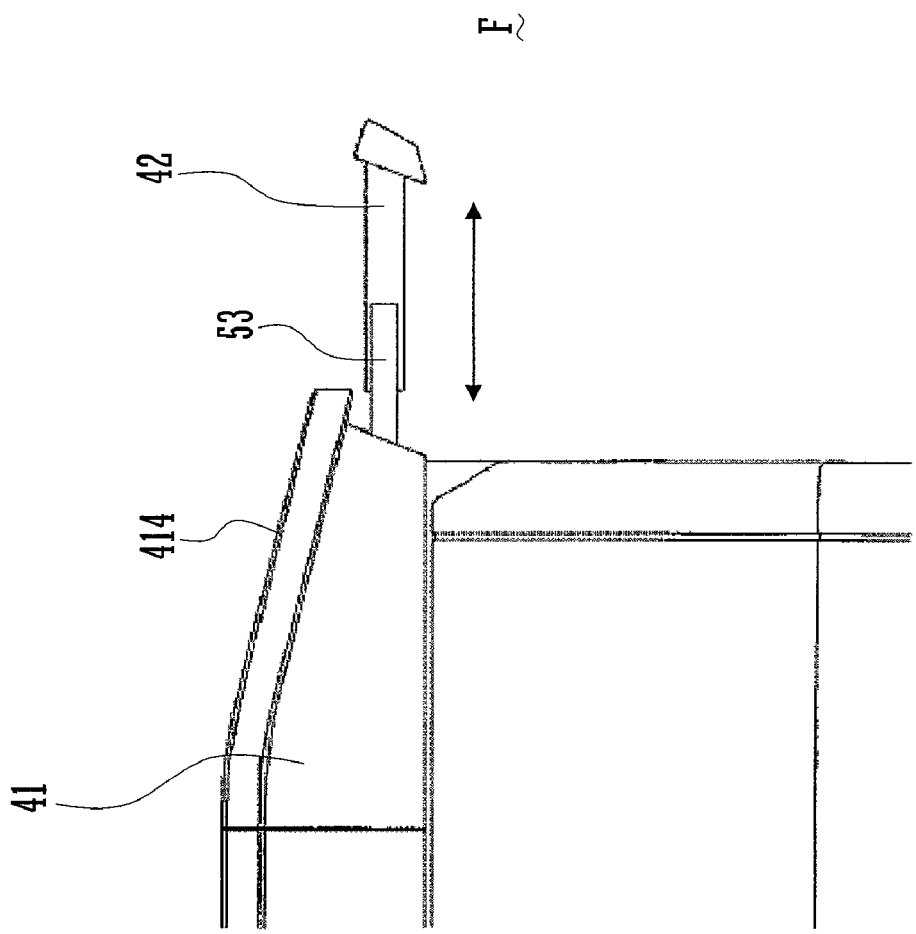

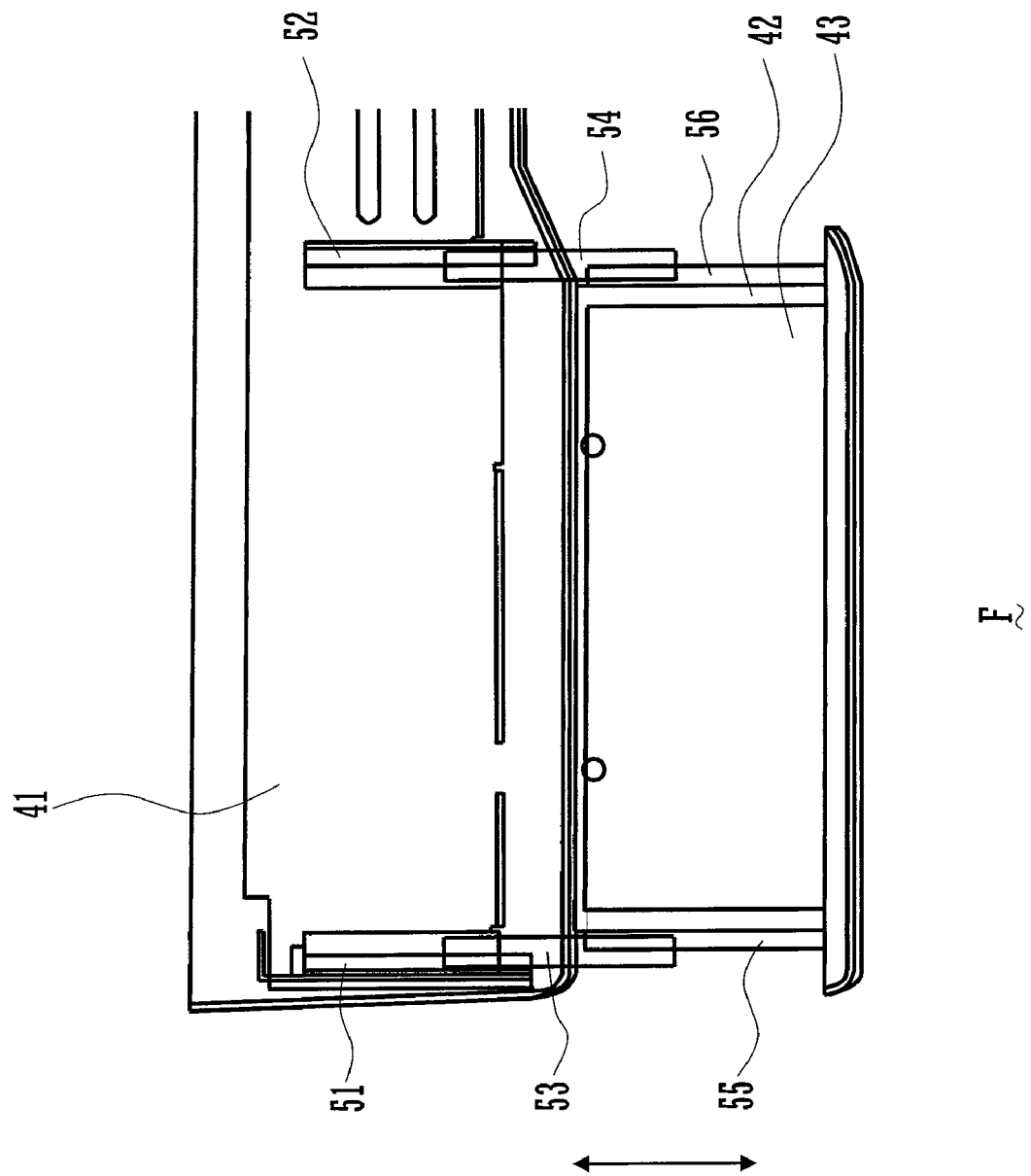

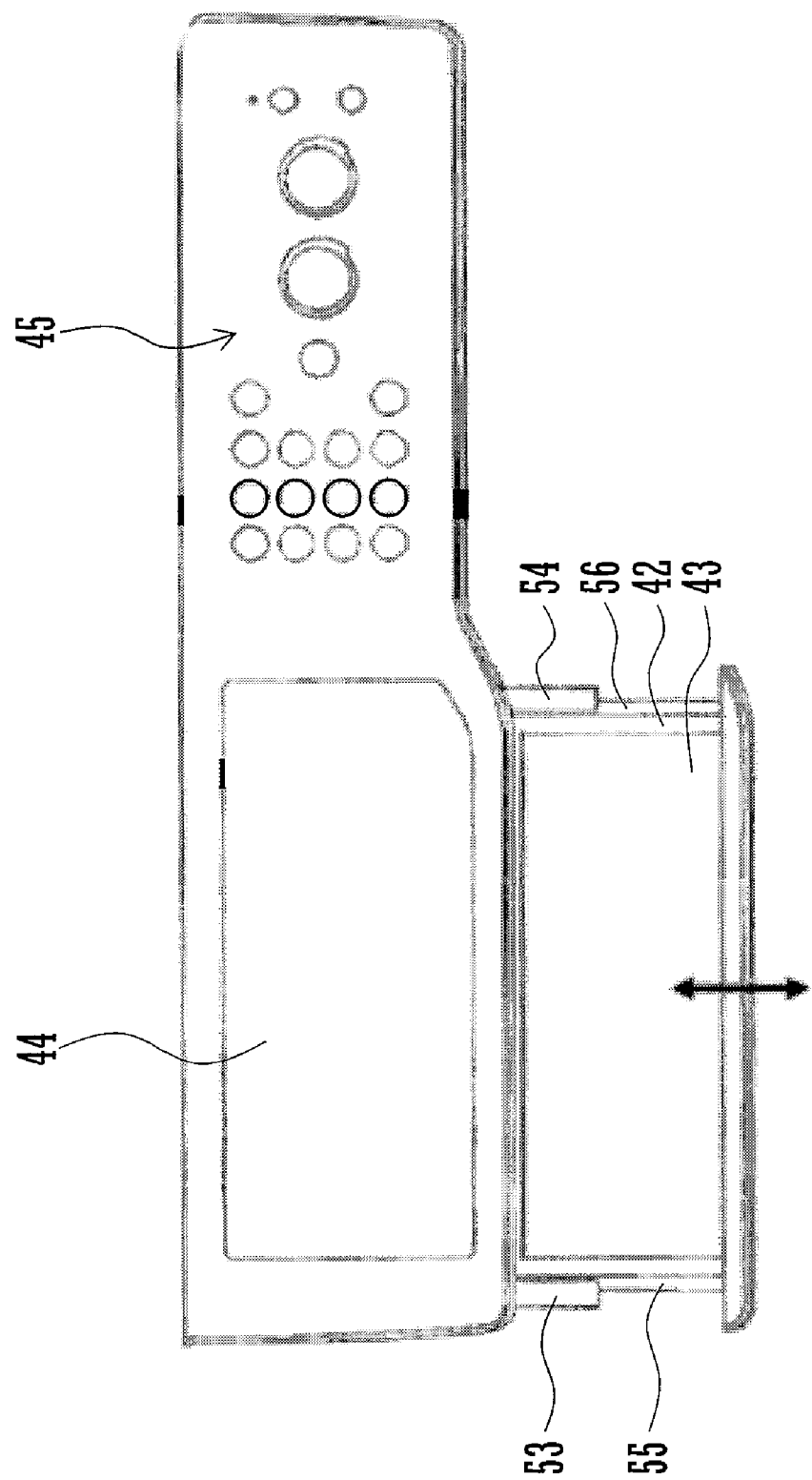

IMAGE PROCESSING DEVICE

CROSS REFERENCE

This Nonprovisional application claims priority under 35 U.S.C. §119(a) on Patent Application No. 2008-169935 filed in Japan on Jun. 30, 2008, the entire contents of which are hereby incorporated by reference.

BACKGROUND OF THE INVENTION

The present invention relates to an image processing device which includes an operating section arranged over a load section in which sheets are loaded.

In an image processing device such as an image formation device or an image reading device or the like, it is often the case that, in order to enhance the ease of use, an operating section which includes input keys for controlling the device is disposed in the upper portion of the device main body. Moreover, in recent years, along with increase of the number of functions of the image processing device, there has been a requirement for increasing the size of such an operating section, and for increase of the size of its input keys, in order to enhance the ease of use.

On the other hand, as for example with the image processing device described in Japanese Laid-Open Patent Publication 2003-241460, among image processing devices, there is a type in which, in order to enhance the operability for a user to load and to take out a recording medium such as a document, a load section which includes a paper ejection load section into which a recording medium upon which image formation has been completed by the image formation device is discharged, and a document load section into which a document to be read by the image reading device is loaded, is disposed in the neighborhood of the upper portion of the device main body. With this type of prior art image processing device, the operating section is disposed above the load section.

With a prior art image processing device having such a structure, when the size of the operating section has been increased, a problem has arisen with regard to reduction of visibility because of the line of sight of the user towards the load section being easily intercepted by the operating section, and also a problem has arisen with regard to deterioration of ease of use, because access by the user to the load section, for loading a document or for extracting a recording medium or a document, can easily be hampered by the operating section.

SUMMARY OF THE INVENTION

An objective of this invention is to provide an image processing device in which the operating section can be increased in size, without any deterioration of the visibility of the load section or of the ease of use.

The image processing device of the present invention includes a processing section, a load section, and an operating section. The processing section performs processing upon sheets. Sheets are loaded into the load section. And the operating section includes input keys which receive input operation for controlling the processing section, and is disposed over the load section. The operating section can be freely shifted between a pulled out position in which the input keys are exposed to the exterior, and a storage position in which it is stored internally.

With this structure, although the operating section is disposed above the load section, it is possible to perform input operation from the operating section by pulling out the operating section to its pulled out position, while nevertheless access to the load section is not hampered by the operating section, since the operating section can be stored in its storage position.

BRIEF DESCRIPTION OF THE DRAWINGS

FIG. 6 is a side view of a portion of this image formation device;

FIG. 7 is a sectional view of a portion of this image formation device;

FIG. 8 is a plan view of a portion of this image formation device;

FIG. 9A shows a state in which a keyboard tray is in a pulled out position, and FIG. 9B shows a state in which the keyboard tray is in a storage position;

FIG. 11A shows a state in which the operating section is in a storage position, and FIG. 11B shows a state in which the operating section is in a pulled out position; FIG. 12A shows the state in which the operating section is in its storage position, and FIG. 12B shows the state in which the operating section is in its pulled out position.

DETAILED DESCRIPTION OF THE INVENTION

Figure 1:
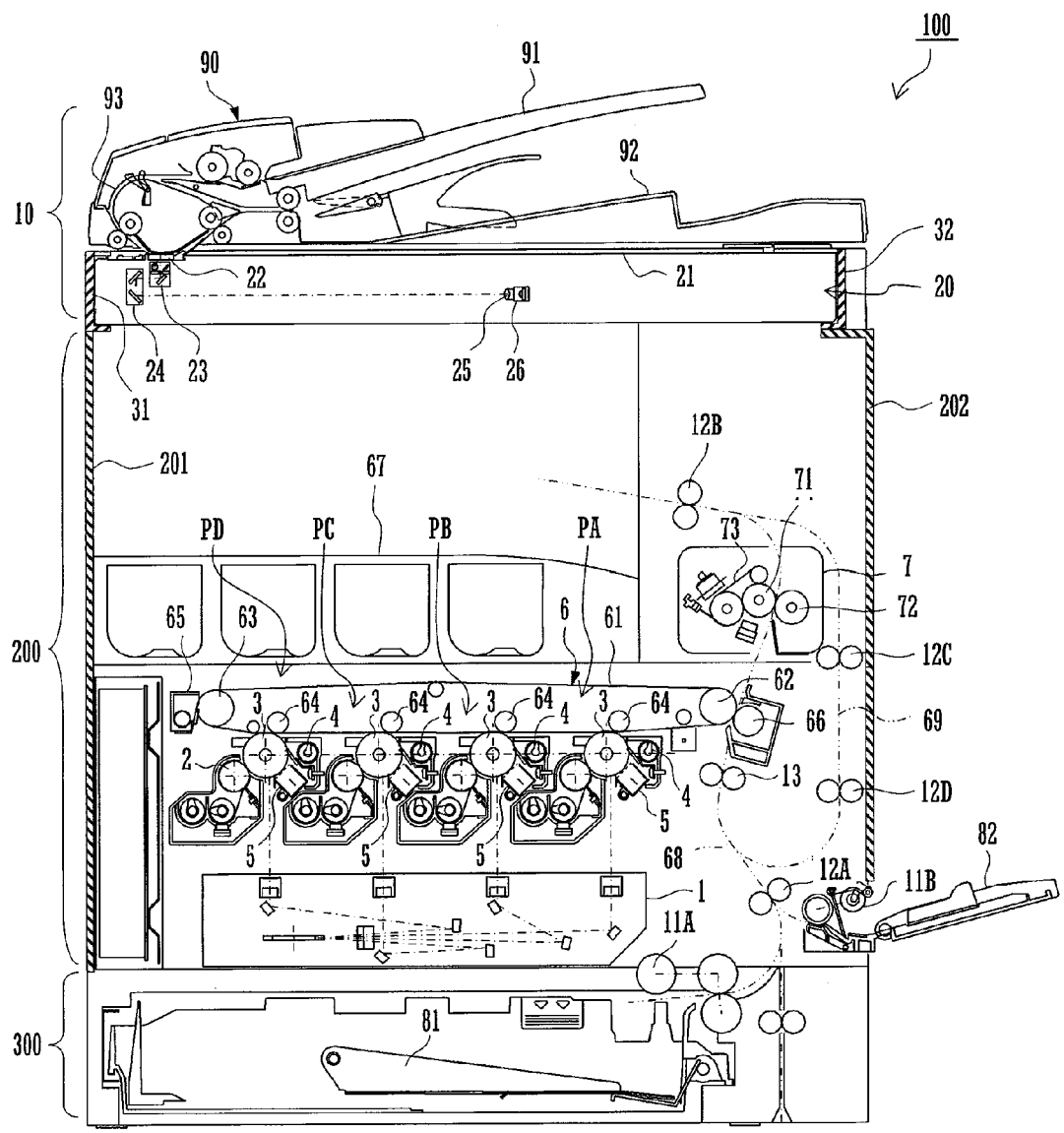
FIG. 1 is a front sectional view of an image formation device according to one embodiment of the image processing device of the present invention.

In the following, preferred embodiments for implementation of the present invention will be explained with reference to the drawings. FIG. 1 shows a front cross sectional view of an image formation device 100 which is an embodiment of the image processing device of the present invention. In FIG. 1, the indication relating to the sectional plane is only shown for a portion thereof.

This image formation device 100 comprises an image reading device 10, an image formation section 200, and a paper supply section 300.

The image reading device 10 is disposed at the upper portion of the image formation device 100, and comprises an automatic document conveyance device 90 (ADF: Automatic Document Feeder) and an image reading section 20. The image reading section 20 comprises a first document support 21, a second document support 22, a first mirror base 23, a second mirror base 24, a lens 25, and a solid-state imaging element 26 (CCD: Charge Coupled Device).

In the ADF 90, a document conveyance path 93 is defined from a document load tray 91 via the second document support 22 to a document discharge tray 92. The ADF 90 conveys sheets of document along this document conveyance path 93, one sheet at a time. The ADF 90 can rotate freely to and fro around its rear edge as a fulcrum, so as either to cover over the upper surface of the first document support 21 or to leave it exposed. Thus, by rotating the ADF 90 so as to raise its front edge upwards, and thereby exposing the upper surface of the first document support 21, it is possible to load a document upon the first document support 21 by manual operation.

The first document support 21 and the second document support 22 are both made from a hard glass plate material.

The first mirror base 23 and the second mirror base 24 can shift freely in the horizontal direction under the first document support 21 and the second document support 22. The shifting speed of the second mirror base 24 is ½ of the shifting speed of the first mirror base 23. A light source and a first mirror are mounted upon the first mirror base 23. And a second mirror and a third mirror are mounted upon the second mirror base 24.

When an image upon a document which is being conveyed by the ADF 90 is to be read, the first mirror base 23 is stopped underneath the second document support 22. The light from the light source is irradiated towards the image surface of a document which passes over the second document support 22, and light which is reflected by this image surface of the document is reflected by the first mirror towards the second mirror base 24.

When an image upon a document which is loaded upon the first document support 21 is to be read, the first mirror base 23 and the second mirror base 24 are shifted in the horizontal direction underneath the first document support 21. The light from the light source is irradiated towards the image surface of the document which is loaded upon the first document support 21, and light which is reflected by this image surface of the document is reflected by the first mirror towards the second mirror base 24.

Irrespective of whether or not the ADF 90 is being used, the light which is reflected by the image surface of the document is directed by the second mirror and the third mirror, along an optical path of constant length, to pass through the lens 25 and to be incident upon the CCD 26.

The CCD 26 outputs an electrical signal which corresponds to the amount of light reflected by the image surface of the document. This electrical signal is inputted to the control unit 400 as image data. In this manner, the image reading section 20 reads an image of the document and acquires image data. And, according to requirements, the control unit 400 outputs this image data to the image formation section 200.

The image formation section 200 is disposed beneath the image formation device 10, and comprises: an exposure unit 1, four development devices 2, four photosensitive drums 3, four cleaning units 4, four electrification devices 5, an intermediate transcription belt 61, four primary transcription rollers 64, a secondary transcription roller 66, a fixing device 7, a paper ejection tray 67, paper stock conveyance paths 68 and 69, and main body frames 201 and 202.

The image formation section 200 performs image formation with image formation units PA, PB, PC, and PD, using image data which corresponds to the following four colors obtained by color decomposition of the color image: black; and cyan, magenta, and yellow which are the three primary subtractive mixing colors. These image formation units PA through PD are arranged in a row along the shifting direction of the intermediate transcription belt 61. All of the image formation units PA through PD are similar in structure.

The image formation unit PA for black comprises one of the development devices 2, one of the photosensitive drum 3, one of the cleaning units 4, one of the electrification devices 5, and one of the primary transcription rollers 64.

The electrification device 5 electrifies the surface of the photosensitive drum 3 to a predetermined electrical potential.

The exposure unit 1 comprises a semiconductor laser, a polygonal mirror, and a first fθ lens and a second fθ lens, none of which are shown in the figure; and it modulates respective laser beams according to the image data for the various colors black, cyan, magenta, and yellow, and irradiates these laser beams upon the respective photosensitive drums 3 of the image formation units PA through PD. Thus, latent electrostatic images corresponding to the image data for the various colors black, cyan, magenta, and yellow are formed upon these respective photosensitive drums 3.

The development devices 2 supply suitable quantities of toner of the hues corresponding to the image formation units PA through PD, to the front surfaces of their photosensitive drums 3 upon which these latent electrostatic images have been formed, and thereby the latent electrostatic images are developed, so as to result in developed images.

The cleaning units 4 retrieve toner remaining upon the surfaces of the photosensitive drums 3, after development and image transcription has been completed.

The intermediate transcription belt 61 defines a loop shaped shift path which extends between a drive roller 62 and a driven roller 63. The outer circumferential surface of the intermediate transcription belt 61 passes over the four photosensitive drums 3 in order. And the primary transcription rollers 64 are disposed in positions which confront the four photosensitive drums 3, with the intermediate transcription belt 61 being sandwiched between them. The positions where the intermediate transcription belt 61 faces the photosensitive drums 3 are termed the primary transcription positions.

In order to transcribe the developed images which are carried upon the surfaces of the photosensitive drums 3 onto the intermediate transcription belt 61, a primary transcription bias whose polarity is opposite to that of the electrification polarity of the toner is applied by constant voltage control to the primary transcription rollers 64. Due to this, the developed images of the four colors which are respectively formed upon the four photosensitive drums 3 are sequentially transcribed, in a mutually overlaid manner, onto the outer circumferential surface of the intermediate transcription belt 61, and thereby a full color developed image is formed upon the outer circumferential surface of the intermediate transcription belt 61.

However, if image data has been only inputted for a subset of the colors black, cyan, magenta, and yellow, then formation of a latent electrostatic image and a developed image is performed only for those ones of the four photosensitive drums 3 which correspond to those colors for which image data has been inputted. For example, during the monochrome printing mode, formation of a latent image and formation of a developed image are only performed for the photosensitive drum 3 of the image formation unit PA which corresponds to black color, and only a black colored developed image is transcribed onto the outer circumferential surface of the intermediate transcription belt 61.

During full color image formation in which image formation is performed with all of the image formation units PA through PD, all of their four primary transcription rollers 64 press the intermediate transcription belt 61 into contact with their corresponding ones of the photosensitive drums 3. On the other hand, during monochrome image formation in which, as described above, image formation is only performed with the image formation unit PA, only the primary transcription roller 64 of that image formation unit PA presses the intermediate transcription belt 61 against the photosensitive drum 3 of that image formation unit PA.

Each of the primary transcription rollers 64 is made by covering the surface of a cylindrical shaft of metallic material (for example, stainless steel) of diameter 8 to 10 mm with an electrically conductive elastic material, so that a uniform high voltage can be applied to the intermediate transcription belt 61 by this electrically conductive elastic material. The elastic material comprises EPDM rubber (ethylene propylene diene M-class rubber), urethane foam, or the like.

The developed image which has been transcribed onto the outer circumferential surface of the intermediate transcription belt 61 at one or more of the primary transcription positions is conveyed, by the rotation of the intermediate transcription belt 61, to a secondary transcription position, which is a position at which the intermediate transcription belt 61 confronts a secondary transcription roller 66. During image formation, this secondary transcription roller 66 is pressed into contact, with a predetermined nipping pressure, against the outer circumferential surface of the intermediate transcription belt 61, whose inner circumferential surface is in contact with the circumferential surface of the drive roller 62.

A plurality of conveyance rollers 12A and 12B are arranged upon the paper stock conveyance path 68. This paper stock conveyance path 86 is arranged in an approximately vertical direction, in order to convey paper stock contained in a paper supply cassette 81 of the paper supply section 300, which is one example of a recording medium, via the secondary transcription position and the fixing device 7 to the paper ejection tray 67.

And a plurality of conveyance rollers 12C and 12D are arranged upon the paper stock conveyance path 69. This paper stock conveyance path 69 is arranged, in the direction of conveyance of the paper stock, from the downstream side of the fixing device 7 to the upstream side of the secondary transcription position. Paper stock which has once passed through the fixing device 7, and which otherwise would be ejected to the paper ejection tray 67, may be conveyed back to the secondary transcription position along this paper stock conveyance path 69, with its edge which, up until now, has been its rear edge, now at the front. Due to this, the paper stock is again conveyed to the secondary transcription position for a second time, this time in the state in which it has been inverted back to front. This arrangement is utilized when performing double-sided printing.

The paper supply section 300 is disposed underneath the image formation section 200, and, apart from the paper supply cassette 81, also includes a manual feed tray 82. Each of the paper supply cassette 81 and the manual feed tray 82 contains a stock of paper.

The paper supply section 300 supplies sheets of paper stock, one at a time, from either the paper supply cassette 81 or the manual feed tray 82. The paper stock which is held in the paper supply cassette 81 is supplied by a pickup roller 11A, and is conveyed to the secondary transcription position via the paper stock conveyance path 68. And the paper stock which is held in the manual feed tray 82 is supplied by a pickup roller 11B, and is conveyed to the secondary transcription position via the paper stock conveyance path 68.

A resistance roller 13 is disposed at the upstream side of the secondary transcription position in the paper stock conveyance direction. In the state in which this resistance roller 13 is stopped, the leading edge of a sheet of paper stock supplied from the paper supply cassette 81 or the manual feed tray 82 strikes against the resistance roller 13. The rotation shaft of the resistance roller 13 is arranged in a direction orthogonal to the conveyance direction of the paper stock. If, at this time, the paper stock is lying obliquely, then this obliqueness is corrected by its leading edge striking against the resistance roller 13 in the stopped state.

The resistance roller 13 starts to rotate, and starts to supply the paper stock to the secondary transcription position, at a timing which matches the edge of the paper stock to the edge of the developed image which has been formed upon the surface of the intermediate transcription belt 61.

When the sheet of paper stock which has been supplied from the paper supply section 300 passes the secondary transcription position, a high voltage of opposite polarity to the electrification polarity of the toner is applied to the secondary transcription roller 66. Due to this, the developed image is transcribed from the outer circumferential surface of the intermediate transcription belt 61 to the front surface of the paper stock.

The developer which remains upon the intermediate transcription belt 61 after the developed image has been transcribed to the paper stock is retrieved by the cleaning device 65 for the intermediate transcription belt.

The sheet of paper stock upon which the developed image has thus been transcribed is fed to the fixing device 7, and is subjected to application of heat and pressure by passing between a heat application roller 71 and a pressurization roller 72. Due to this, the developed image is permanently fixed upon the front surface of the paper stock. Then this paper stock, upon which the developed image has been fixed, is discharged to the paper ejection tray 67.

Figure 2:
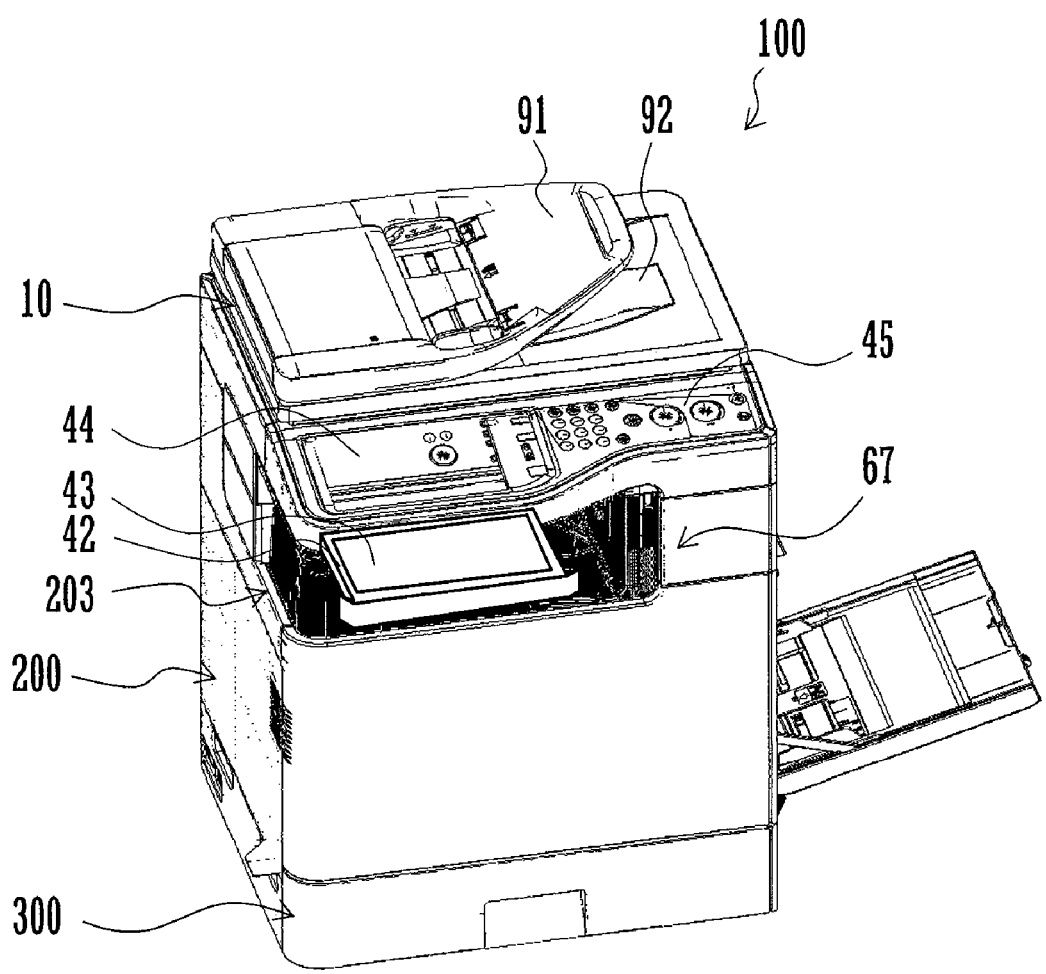
FIG. 2 is a perspective view of this image formation device.

As shown in FIG. 2, the image formation section 200 internally houses the image formation units PA through PD. The cross section of a portion of the image formation section 200 is made to be smaller, so as to leave a region to constitute the paper ejection tray 67; and, due to this, a concave portion 203 is provided on the side of the image formation section 200. The image formation section 200 corresponds to the "device main body" of the Claims of the present application. In this embodiment, the concave portion 203 opens to the front surface and the left side surface of the image formation section 200. The paper ejection tray 67 is disposed in the bottom portion of the concave portion 203. This paper ejection tray 67 corresponds to the "load section" of the Claims of the present application. A display unit 44 such as a liquid crystal touch panel or the like, and a fixed configuration type input unit 45 which includes input keys such as a tenkey pad and a start key and so on, are fixedly disposed upon the upper surface of the image formation device 100. This display unit 44 and fixed configuration type input unit 45 are arranged to be above the paper ejection tray 67.

Figure 3:
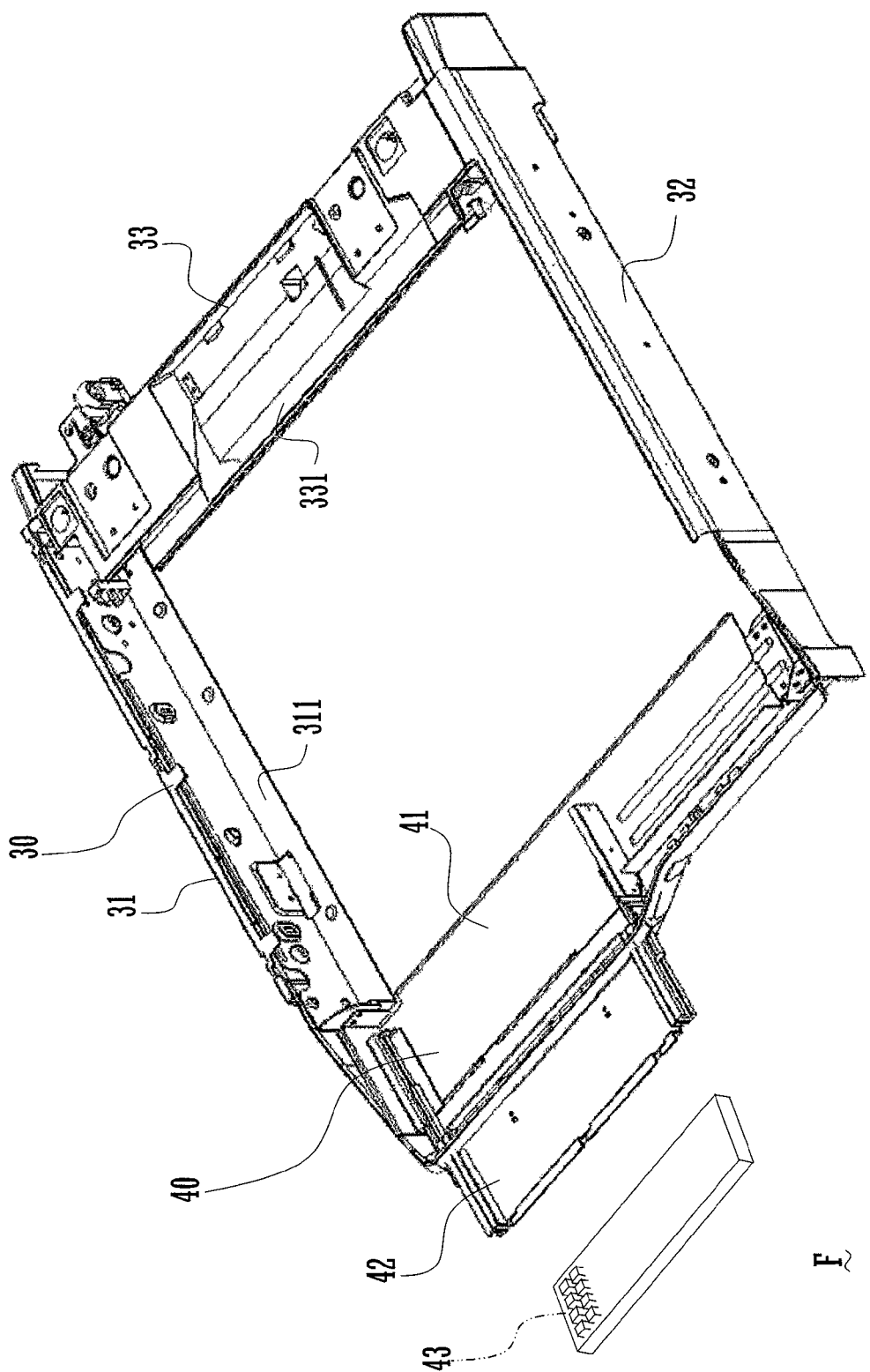
FIG. 3 is a perspective view of a frame and an operating section.
Figure 4:
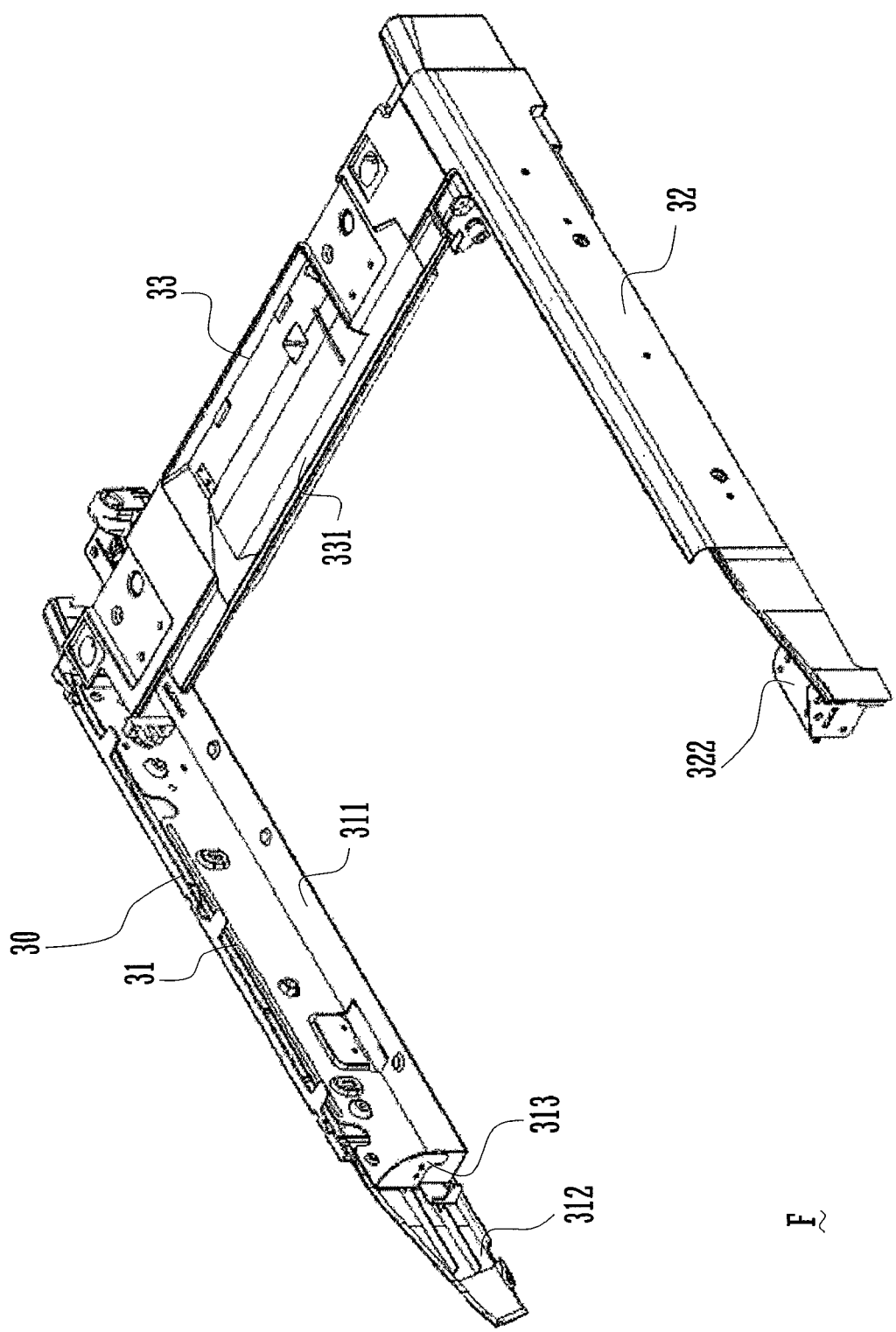
FIG. 4 is a perspective view of the frame.
Figure 5:
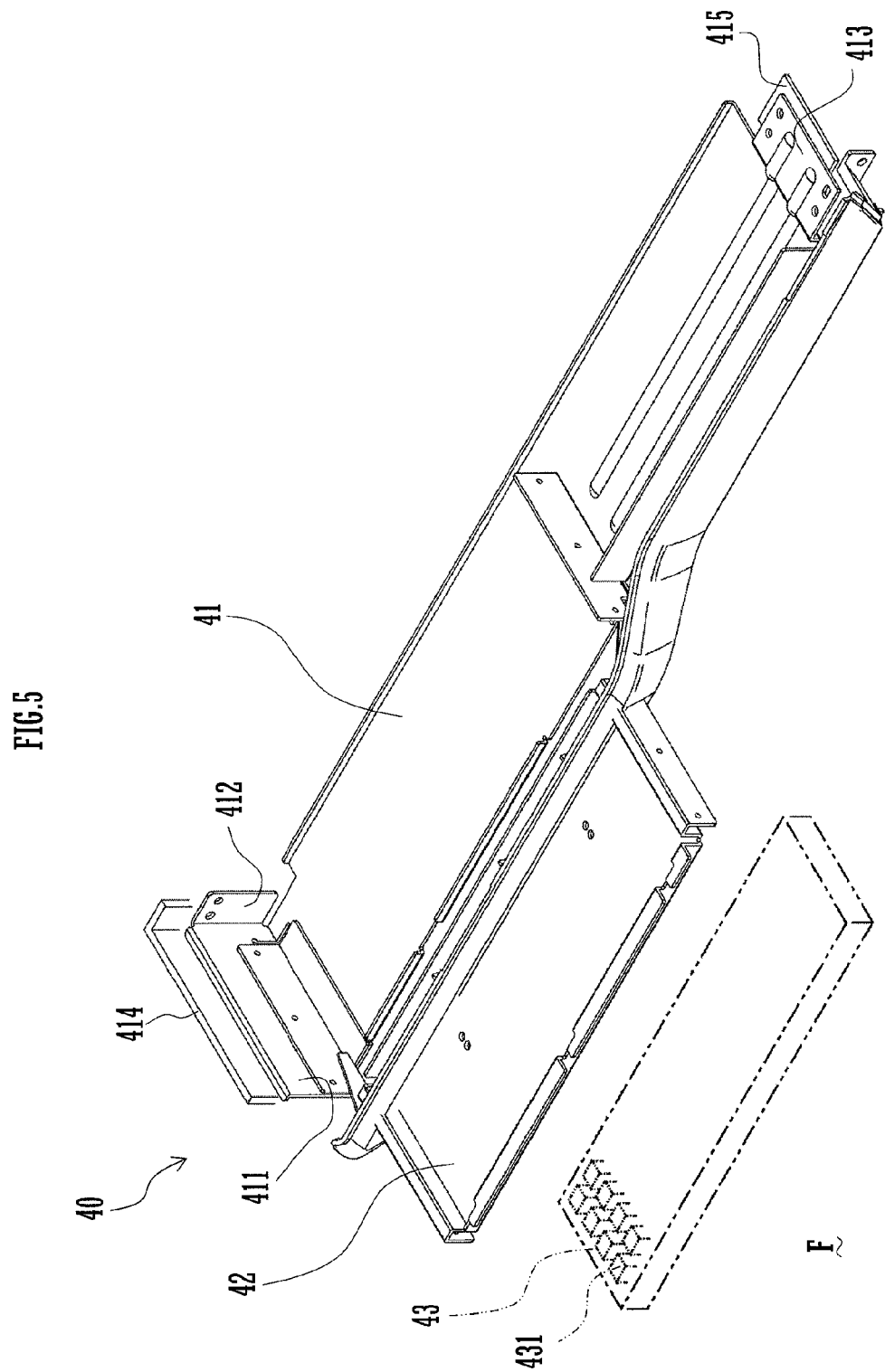
FIG. 5 is a perspective view of the operating section.

FIG. 3 is a perspective view of a frame 30 and an operating section 40. FIG. 4 is a perspective view of the frame 30. And FIG. 5 is a perspective view of the operating section 40. Apart from the ADF 90 and the image reading section 20, the image reading device 10 also comprises the frame 30 and the operating section 40.

The frame 30 is made from metal, and includes a left frame portion 31, a right frame portion 32, and a rear frame portion 33. By a three-sided rectangle being defined by the left frame portion 31, the right frame portion 32, and the rear frame portion 33, the frame 30 is formed in an approximately letter-U shape. As shown in FIG. 1, the frame 30, including the left frame portion 31 and the right frame portion 32, is fixed to the upper portions of the main body frames 201 and 202 of the image formation section 200.

The left frame portion 31 includes a reception portion 311 which projects horizontally towards the right frame portion 32. And the right frame portion 32 includes a similar reception portion 311 which projects horizontally towards the left frame portion 31 (but this cannot be seen in the FIG. 3 and FIG. 4 views). The rear frame portion also has a reception portion 331 which projects horizontally towards the front portion F. The image reading section 20 is supported by the reception portions 311 and 331 of the left frame portion 31, the right frame portion 32, and the rear frame portion 33, with the interposition of shock absorption members not shown in the figures.

The left frame portion 31 includes a protruding portion 312 and a first support portion 313. The protruding portion 312 is plate shaped and aligned in the vertical direction, and protrudes in the direction of the front portion F, from the end portion of the left frame portion 31 towards the front portion F. And the first support portion 313 is arranged at the base portion of the protruding portion 312, and is aligned in a direction which is vertical and is orthogonal to the direction of the protruding portion 312.

The right frame portion 32 has an end portion on the side of the front portion F, and a second support portion 322 which projects horizontally towards the left frame portion 31.

The operating section 40 comprises an operating section main body portion 41, a keyboard tray 42, and a keyboard 43. This operating section 40 is supported upon the frame 30.

The keyboard 43 comprises a plurality of input keys 431, which receive input operation for controlling the image formation device 100 as a whole, including the image reading device 10 and the image formation section 200. This keyboard 43 is installed upon the keyboard tray 42. The keyboard tray 42 and the keyboard 43 correspond to the "operating section" of the Claims of the present application.

The operating section main body portion 41 comprises a standing portion 411, a first fixing portion 412, and a second fixing portion 413. The standing portion 411 is arranged at the end portion which opposes the left frame portion 31, and extends in a direction parallel to the protruding portion 312 of the left frame portion 31. The first fixing portion 412 is arranged at the end portion which opposes the left frame portion 31, and extends in a direction parallel to the first support portion 313. And the second fixing portion 413 is arranged at the end portion which opposes the right frame portion 32, and extends so as to protrude in the horizontal direction.

When the operating section main body portion 41 is installed to the frame 30, the protruding portion 312 is arranged so as to overlap the standing portion 411, and thereby regulates movement of the operating section main body portion 41 in the leftwards and rightwards direction. The first support portion 313 is arranged so as to overlap the first fixing portion 412, and regulates movement of the operating section main body portion 41 in the forwards and rearwards direction. The first fixing portion 412 is fixed to the first support portion 313 by screws. And the second support portion 322 is arranged so as to overlap the second fixing portion 413, and regulates movement of the operating section main body portion 41 in the vertical direction. The second fixing portion 413 is fixed to the second support portion 322 by screws.

Since the operating section 40 is supported upon the frame 30, accordingly transmission to the image reading section 20 of vibration caused by depression of the input keys 431 is suppressed.

A first vibration absorption member 414 is disposed between the protruding portion 312 and the standing portion 411, and between the first support portion 313 and the first fixing portion 412. And a second vibration absorption member 415 is disposed between the second support portion 322 and the second fixing portion 413. Due to the provision of this first vibration absorption member 414 and this second vibration absorption member 415, transmission to the image reading section 20 of vibration caused by depression of the input keys 431 is suppressed.

FIG. 6 is a side view of a portion of the image formation device 100. FIG. 7 is a sectional view of a portion of the image formation device 100. And FIG. 8 is a plan view of a portion of the image formation device 100.

The keyboard tray 42 is supported by the operating section main body portion 41, and can be freely moved between a pulled out position in which its input keys 431 are exposed to the exterior, and a storage position in which it is stored internally. In its pulled out position, this keyboard tray 42 projects in the horizontal direction.

The operating section main body portion 41 includes a first left rail 51 and a first right rail 52, which are arranged with a gap between them corresponding to the width dimension of the keyboard tray 42.

The first left rail 51 supports a left link member 53 so that it can slide freely in the forward and rearward direction. Similarly, the first right rail 52 supports a right link member 54 so that it can slide freely in the forward and rearward direction.

The keyboard tray 42 includes a second left wail 55 and a second right rail 56. The left link member 53 supports the second left rail 55 so that it can slide freely in the forward and rearward direction. Similarly, the right link member 54 supports the second right rail 56 so that it can slide freely in the forward and rearward direction.

Due to this structure, the keyboard 42 can be freely displaced between its pulled out position and its storage position.

Each of the pairs consisting of the first left rail 51 and the left link member 53, the first right rail 52 and the right link member 54, the left link member 53 and the second left rail 55, and the right link member 54 and the second right rail 56, has a first engagement mechanism which mutually engages, so as to ensure that, as an overall result, the keyboard tray 42 does not pull out further than its predetermined pulled out position, and moreover has a second engagement mechanism, all of which cooperate to ensure that the keyboard tray 42 does not go inwards further than its predetermined storage position.

Moreover, the keyboard tray 42 and the operating section main body portion 41 are provided with a third engagement mechanism which is built so as to engage the keyboard tray 42 in its storage position, and so that, when the keyboard tray 42 is pulled out with a force which is greater than or equal to a predetermined value, this engagement of the keyboard tray 42 is overcome.

The display unit 44 and the fixed configuration type input unit 45 are fixedly arranged upon the upper surface of the operating section main body portion 41. Information which corresponds to input operation from the fixed configuration type input unit 45 and the keyboard 43 is displayed upon the display unit 44. Thus, the fixed configuration type input unit 45 and the keyboard 43 constitute an input unit which receives input operation for controlling the image formation device 100.

Since the keyboard tray 42 can be freely displaced between its pulled out position and its storage position, accordingly, in addition to the fixed configuration type input unit 45 which is disposed upon the upper surface of the operating section main body portion 41, it is possible also to provide the keyboard 43, while still suppressing increase in size of the image reading device 10. Since, by doing this, it becomes possible to increase the number of the input keys and also their sizes, while nevertheless suppressing increase in size of the image reading device 10, accordingly it becomes possible to simplify the input operation.

Moreover, although the keyboard 43 is arranged above the paper ejection tray 67, input operation from the keyboard 43 can be enabled by pulling out the keyboard 43 to its pulled out position, while on the other hand, by pushing in the keyboard 43 and storing it in its storage position, it is possible to ensure that access to the paper ejection tray 67 is not hampered by the keyboard 43. Accordingly, by making it possible to shift the keyboard 43 freely between its pulled out position and its storage position, it is possible to increase the size of the keyboard 43 without decreasing the visibility and the ease of use of the paper ejection tray 67, even though the keyboard 43 is arranged above the paper ejection tray 67. Moreover, by providing the fixed configuration type input unit 45 in addition to the keyboard 43, it is possible to increase the size of the input unit, without decreasing the visibility and the ease of use of the paper ejection tray 67.

In the storage position, the keyboard tray 42 and the keyboard 43 are arranged so as to be positioned underneath the display unit 44 and overlapped thereby. Moreover, in their pulled out position, the keyboard tray 42 and the keyboard 43 are in the state of being adjacent to the display unit 44. By arranging for the keyboard tray 42 and the keyboard 43 to be positioned underneath the display unit 44 in their storage position and overlapped thereby, it is ensured that the keyboard tray 42 and the keyboard 43 do not cause any decrease of visibility to the user of the paper ejection tray 67, or of its ease of use. Moreover, by the keyboard 43 and the display unit coming to be in a state of being adjacent to one another when the keyboard tray 42 and the keyboard 43 have been pulled out from underneath the display unit 44, it becomes possible for the user simply and easily to check the contents inputted from the keyboard 43, upon the display unit 44.

Furthermore, as shown in FIG. 2, the width dimension of the keyboard tray 42 may be made to be smaller than the width dimension of the aperture in the front surface of the concave portion 203. By doing this, it is possible simply and easily to access the paper ejection tray 67, even when the keyboard tray 42 is in its pulled out position.

Figure 9A:
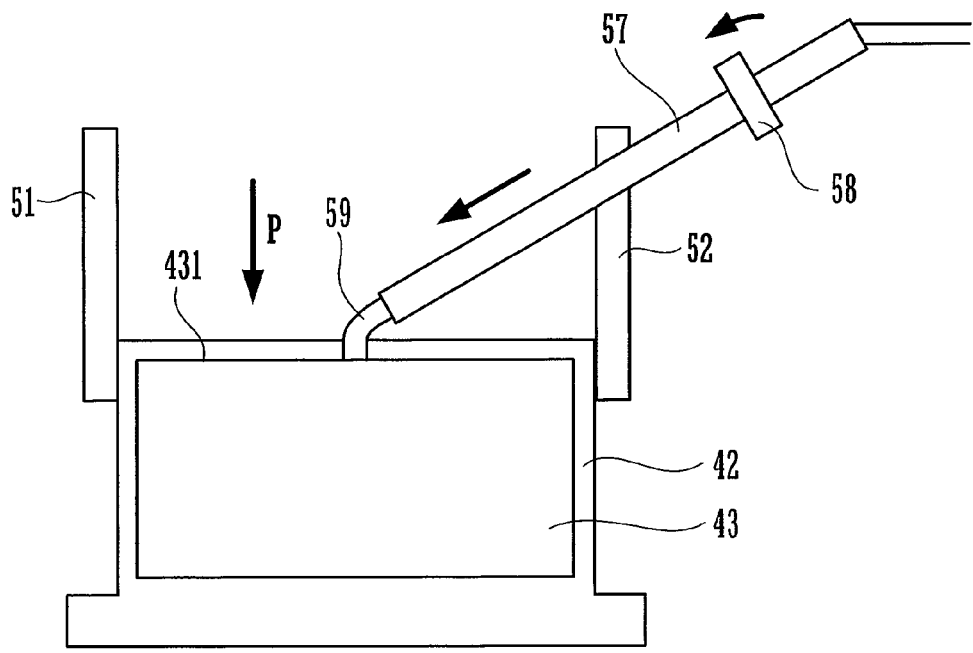
FIGS. 9A and 9B are sectional views of a portion of this image formation device.
Figure 9B:
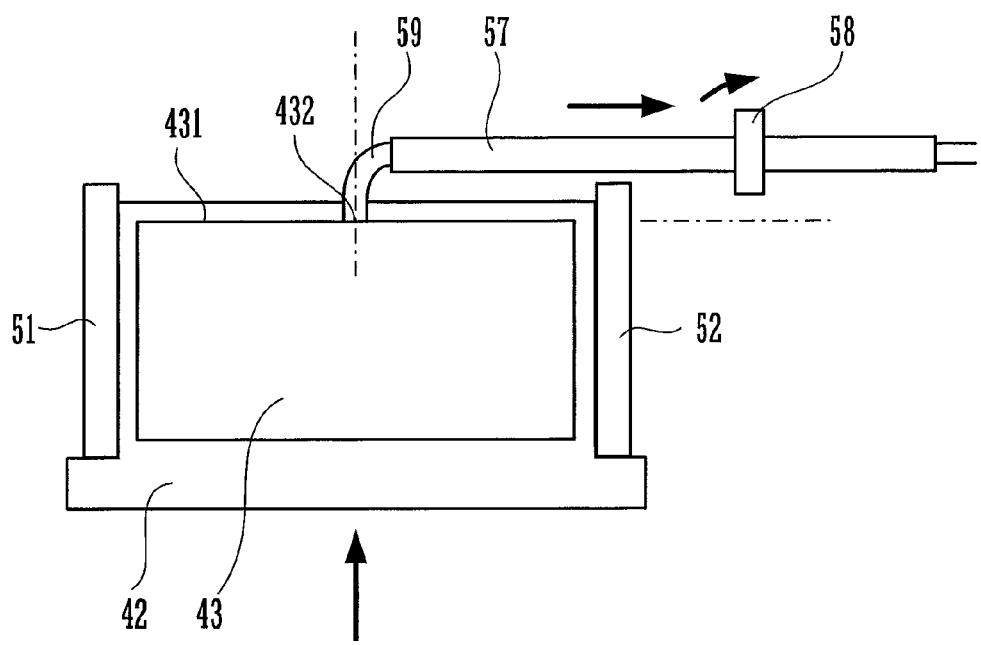

FIG. 9A shows the state in which the keyboard tray 42 is in its pulled out position, and FIG. 9B shows the state in which the keyboard tray 42 is in its storage position.

The operating section 40 further comprises a tubular member 57 and a rotation member 58.

The tubular member 57 covers an electric cord 59 which is connected to the edge portion 431 of the keyboard 43 which is to the rear, as seen in the direction P in which the keyboard tray 42 is pulled out. This tubular member 57 is of a predetermined length, and is hard enough not to be bent when the keyboard tray 42 is displaced.

The rotation member 58 is pierced with a through hole 581, and thereby can slide freely upon the tubular member 57. When the keyboard tray 42 is displaced between its pulled out position and its storage position, the rotation member 58 moves to and fro and also rotates upon the operating section main body portion 41 which serves as a shaft, and is rotationally supported thereby while also sliding thereupon. In more concrete terms, the rotation member 58 is supported upon the operating section main body portion 41 so as to rotate freely in a horizontal plane, at a position in the direction along the pulling out direction P which is different from the connection point 432 between the electric cord 59 and the keyboard 43, and which is more to the upstream side of the keyboard 43, than its rear edge portion 431 in the pulling out direction P when it is in its storage position.

When the keyboard tray 42 is displaced between its pulled out position and its storage position, the tubular member 57 slides through the through hole 581 of the rotation member 58 without being bent. Due to this, the electric cord 59 is not bent and does not suffer any abrasion from neighboring members. Accordingly, along with it being possible to suppress vibration due to abrasion suffered by the electric cord 59 when the keyboard tray 42 is displaced between its two positions, also damage to the electric cord 59 is prevented. Moreover, since it is not necessary to provide any large space in order to prevent damage being caused to the electric cord 59, accordingly it may be anticipated that the image reading device 20 can be made more compact.

Figure 10:
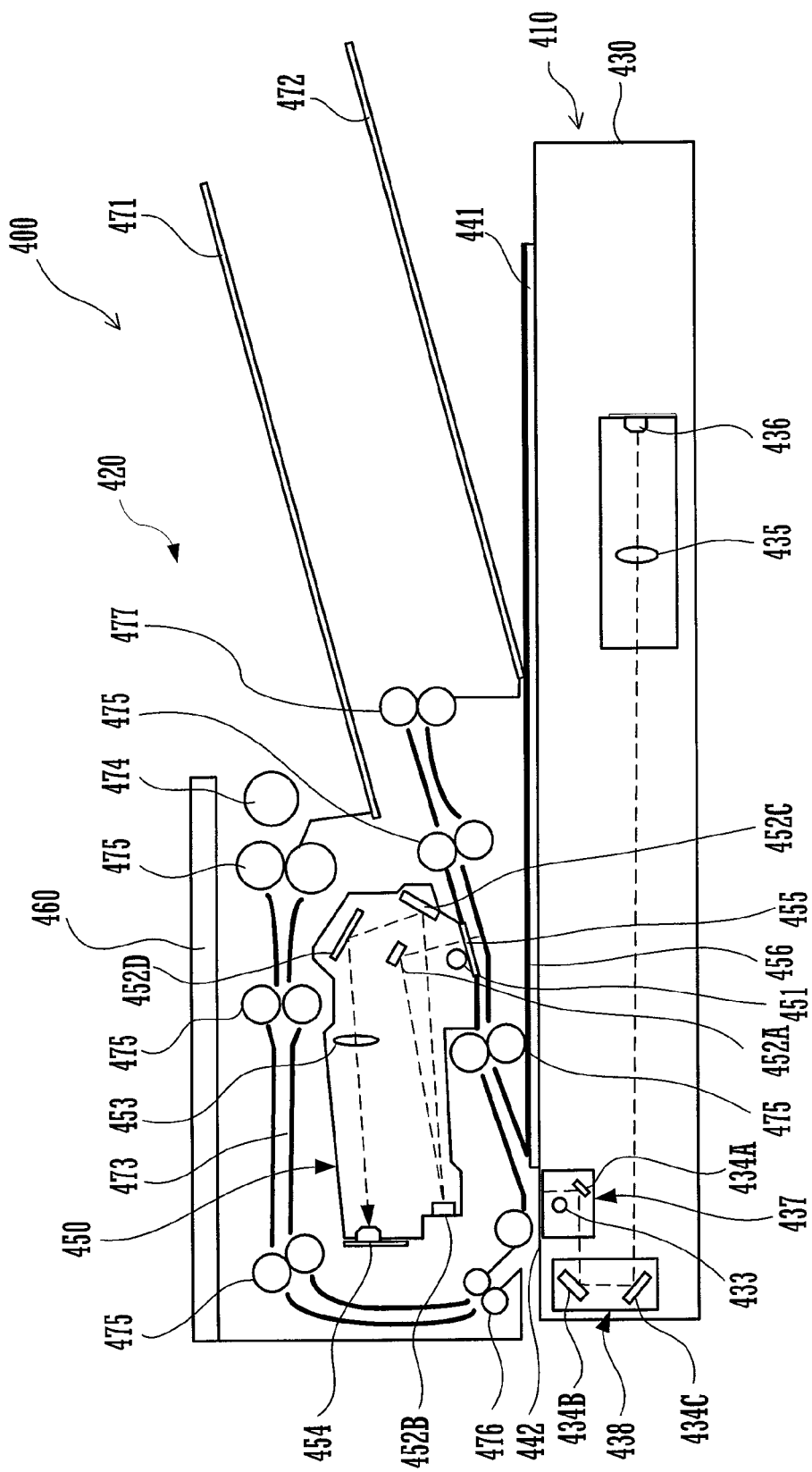
FIG. 10 is a front sectional view of an image reading device according to another embodiment of the image processing device of the present invention.

FIG. 10 shows a front cross sectional view of an image reading device 400 according to another embodiment of the image processing device of the present invention. In FIG. 10, no particular indication is shown relating to the sectional plane. This image reading device 400 may, for example, be installed above the image formation section 200 in the image formation device 100 described above, instead of the image reading device 10.

This image reading device 400 comprises a main scanning section 410 and an ADF 420.

The main scanning section 410 comprises a first image reading section 430 and platen glasses 441 and 442. The platen glasses 441 and 442 are disposed horizontally upon the upper surface of the main scanning section 410.

The first image reading section 430 is an image reading means of a reducing optical system which includes a light source 433, first through third mirrors 434A, 434B, and 434C, a lens 435, and a CCD (charge coupled device) 436. The light source 433 and the first mirror 434A are mounted to a light source unit 437, and the second mirror 434B and the third mirror 434C are mounted to a mirror unit 438.

The main scanning section 410 is capable of performing two different types of image reading processing: image reading processing by a stationary document method, in which an image upon a document which is mounted upon the platen glass 441 is read; and image reading processing by a moving document method, in which the images upon a document are read while the document is moved over the platen glass 442 by the ADF 420.

In image reading processing by the stationary document method, the light source unit 437 is shifted in the secondary scanning direction (the left and right direction in FIG. 10) while irradiating light upon the document, and the mirror unit 438 is shifted in the same direction as the light source unit 437 at half the speed of the light source unit 437.

After the light which is irradiated from the light source unit 437 and is reflected by the document has been reflected by the first mirror 434A which is mounted upon the light source unit 437, its optical path is turned around through 180° by the second mirror 434B and the third mirror 434C which are mounted upon the mirror unit 438. The light which is reflected by the third mirror 434C is imaged by the lens 435 upon the CCD 436, and is converted thereby into image data.

On the other hand, in image reading processing by the moving document method, while the light source unit 437 and the mirror unit 438 are being held stationary in a predetermined home positions as shown in FIG. 10, light from the light source 433 is irradiated upon the document, which is being conveyed by the ADF 420 so as to pass a predetermined first image reading position upon the platen glass 442. The light which has been reflected by a first surface of the document is reflected by the first mirror 434A, and then its optical path is turned around through 180° by the second mirror 434B and the third mirror 434C which are mounted upon the mirror unit 438. And this light which is reflected by the third mirror 434C is imaged by the lens 435 upon the CCD 436, and is converted thereby into image data.

The ADF 420 is rotatably supported upon the main scanning section 410 by a hinge not shown in the figures, and thereby can be freely opened and closed, either to expose the upper surface of the platen glass 441 or to contact against it.

This ADF 420 comprises a second image reading section 450, an actuation unit 460, a document load tray 471, a document discharge tray 472, and a document conveyance path 473. The actuation unit 460 is disposed at the upper portion of the ADF 420.

The ADF 420 conveys a document which has been loaded upon the document load tray 471 along the document conveyance path 473, and finally discharges it into the document discharge tray 472. The document conveyance path 473 is formed in an approximate letter-U shape. The document load tray 471 and the document discharge tray 472 are included in the "load section" of the Claims of the present application.

Along the document conveyance path 473 there are disposed: a pulling in roller 474, a plurality of pairs of conveyance rollers 475, a pair of resistance rollers 476, and a pair of document discharge rollers 477. The pulling in roller 474 pulls a document which has been loaded into the document load tray 471 into the document conveyance path 473, one sheet at a time. The pairs of conveyance rollers 475 convey the document along the document conveyance path 473 in a predetermined conveyance direction. The pair of resistance rollers 476 adjust the timing at which the document is conveyed over the platen glass 442. And the pair of document discharge rollers 477 discharge the document into the document discharge tray 472, after image reading processing thereof has been completed.

The second image reading section 450 is disposed on the inside of the approximately letter-U shaped arc which is described by the document conveyance path 473. This second image reading section 450 comprises a light source 451, first through fourth mirrors 452A, 452B, 452C, and 452D, a lens 453, and a CCD 454, and consists of a unified combination of these elements.

When reading from both sides of the original document is demanded, then the second image reading section 450 reads an image from the second side of the document which is being conveyed along the document conveyance path 473. The document, from which the image upon its first side has been read by the first image reading section 430, is conveyed along the document conveyance path 473 towards the document discharge tray 472, and passes past a predetermined second image reading position. At this second image reading position, light from the light source 451 is irradiated upon the document. The light which has been reflected by the second surface of the document passes through a reading window 455 which is made from a transparent material such as glass or the like, and, after its path has been changed by the first through the fourth mirrors 452A, 452B, 452C, and 452D in sequence, is imaged via the lens 453 upon the CCD 454, and is converted thereby into image data.

The bottom surface of the ADF 420 is made as a pressure plate 456, which presses from above upon a document which has been mounted upon the platen glass 441 of the main scanning section 410.

Figure 11A:
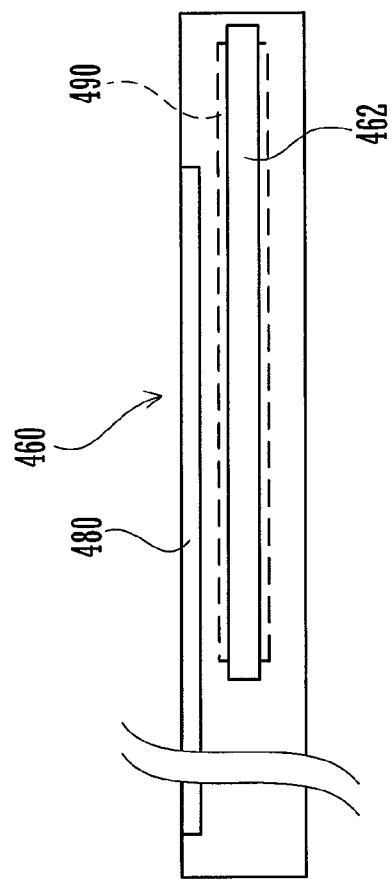
FIGS. 11A and 11B are sectional views of an operating section of this image reading device.
Figure 11B:
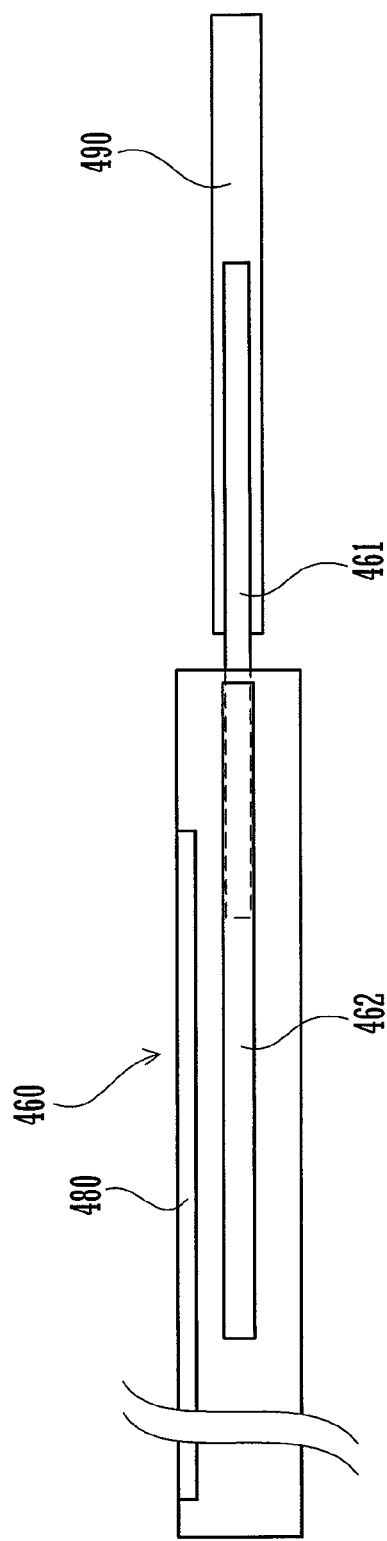
Figure 12A:
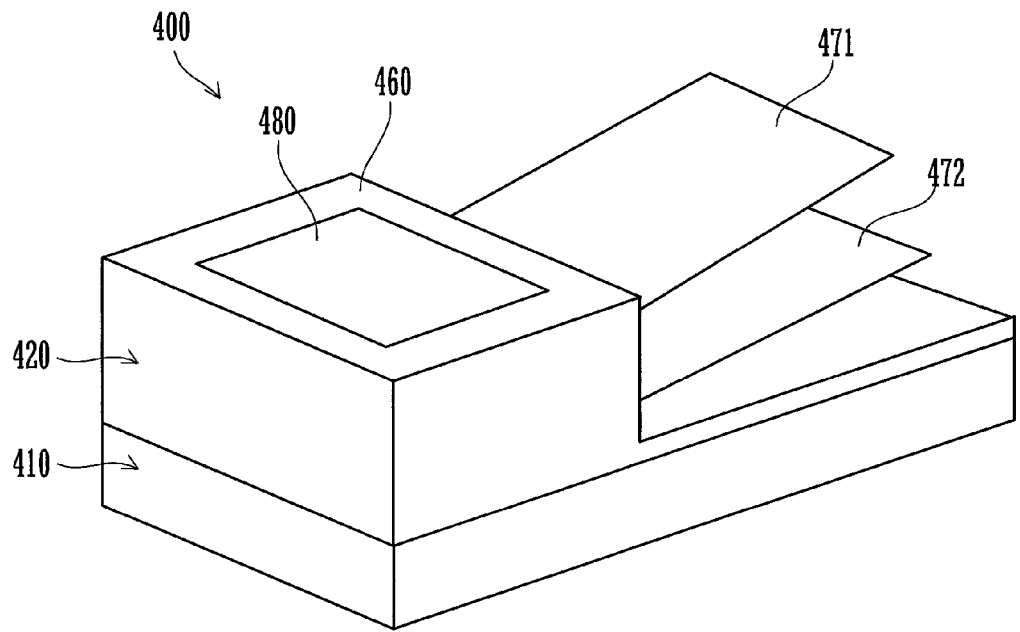
FIGS. 12A and 12B are perspective views of this image reading device.
Figure 12B:
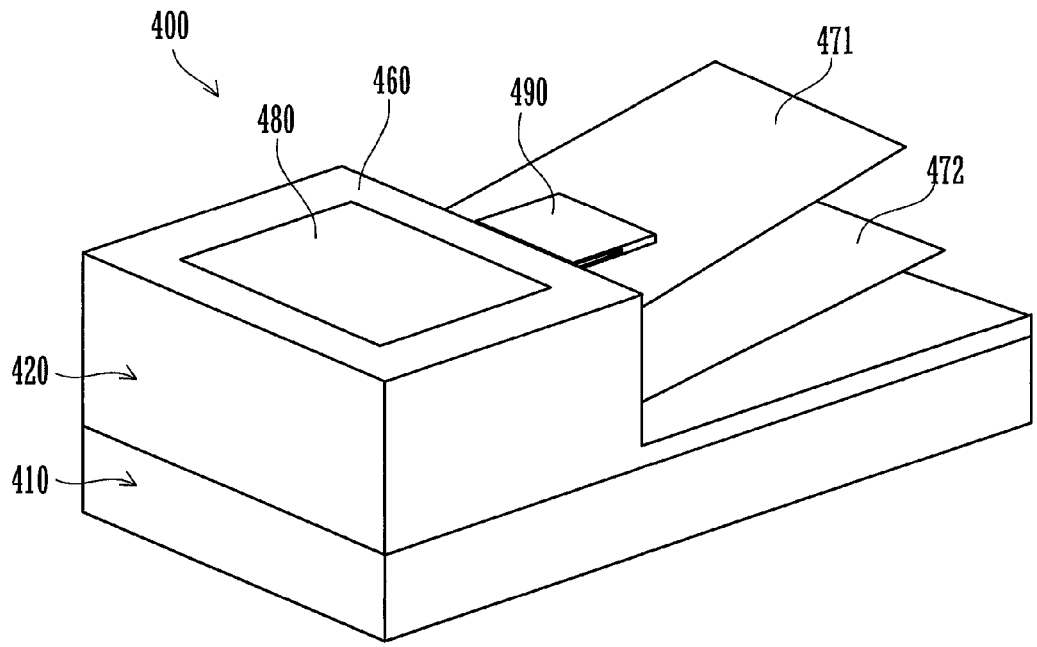

FIGS. 11A and 12A show the state in which an operating section 490 is stored in its storage position, while FIGS. 11B and 12B show the state in which this operating section 490 has been pulled out to its pulled out position. In FIGS. 11A and 11B, no particular indication is shown relating to the sectional plane.

The actuation unit 460 is disposed on the upper portion of the ADF 420, and comprises a display unit 480 and the operating section 490.

For the display unit 480, for example, a liquid crystal display may be used. This display unit 480 is disposed upon the upper surface of the actuation unit 460. The display unit 480 displays information corresponding to input operation from the operating section 490.

For the operating section 490, for example, a keyboard may be used. This operating section 490 has a plurality of input keys, not shown in the figures, which receive input operation for controlling the image reading device 400 as a whole, including the first image reading section 430 and the second image reading section 450.

The operating section 490 is positioned above the document load tray 471 and the document discharge tray 472, and in particular, in its pulled out position, is positioned directly above the document load tray 471 and the document discharge tray 472.

Both side edge portions of the operating section 490 are provided with first rails not shown in the figures. Each of these first rails is supported by one of a pair of link members 461 so as to slide freely. And each of these link members 461 is supported, so as to slide freely, by one of a pair of second rails 462, which are provided in the interior of the operating section 490 with an appropriate gap between them. Accordingly, the operating section 490 can be freely shifted between a pulled out position in which its input keys are exposed to the exterior, and a storage position in which it is stored internally. In its storage position, the operating section 490 is disposed so as to lie underneath the display unit 480 and so as to be overlapped thereby.

Since the operating section 490 can be freely displaced between its pulled out position and its storage position, accordingly, even though the operating section 490 is positioned above the document load tray 471 and the document discharge tray 472, still it is possible to increase the size of the operating section 490, without any decrease of the visibility of the document load tray 471 and the document discharge tray 472, and without any deterioration of the ease of use for loading a document upon the document load tray 471, or for taking out a document from the document discharge tray 472.

Since the operating section 490 is arranged so as, in its storage position, to lie underneath the display unit 480 and so as to be overlapped thereby, accordingly the operating section 490 does not cause any decrease of the visibility and the ease of use of the document load tray 470 and the document discharge tray 472. Moreover, by pulling out the operating section 490 from underneath the display unit 480, the operating section 490 comes to be in a state adjacent to the display unit 480, so that it becomes possible to check the details of input operation from the operating section 490 upon the display unit 480 in a simple and easy manner.

Upon the upper surface of the actuation unit 460, apart from the display unit 480, there is also provided, in a fixed manner, a fixed configuration type input unit not shown in the figures, including input keys such as a tenkey pad and a start key and so on.

Information which corresponds to input operation from this fixed configuration type input unit is displayed upon the display unit 480, in addition to information corresponding to input operation from the operating section 490. The operating section 490 and the fixed configuration type input unit together constitute an input unit which receives input operation for controlling the image reading device 400.

Since the operating section 490 is provided in addition to the fixed configuration type input unit 45, and since this operating section 490 can be freely displaced between its pulled out position and its storage position, accordingly, even though the operating section 490 is positioned over the document load tray 471 and the document discharge tray 472, nevertheless it is possible to increase the size of the input unit, without any deterioration of the visibility and the ease of use of the document load tray 471 and the document discharge tray 472.

All of the features of the embodiments described above are given by way of example, and must not be considered as being limitative of the present invention in any way. The range of the present invention is defined, not by the embodiments described above, but by the scope of the appended Claims. Moreover, it is intended that all changes, within the meaning and scope equivalent to the range of the appended Claims, should be included within the range of the present invention.

What is claimed is:

1. An image processing device, comprising:
   a processing section which performs processing upon sheets;
   a load section into which sheets are loaded;
   an operating section, comprising input keys which receive input operation for controlling said processing section, and disposed over said load section; and
   a display unit which displays information corresponding to input operation from said operating section;
   wherein said operating section can be freely shifted between a pulled out position in which said input keys are exposed to the exterior and a storage position in which it is stored internally, and, in said storage position, is disposed below said display unit.

2. An image processing device according to claim 1, wherein said operating section is disposed in the neighborhood of said display unit.

3. An image processing device according to claim 1, wherein said operating section is disposed so as, in its said storage position, to be below said display unit and overlapped thereby.

4. An image processing device according to claim 1, wherein:
   said processing section is an image formation unit which forms an image upon a recording medium; and
   said load section is a paper ejection tray which is disposed within a concave portion provided upon a side of a device main body which houses said image formation unit, and onto which a recording medium, upon which image formation has been completed and which has been discharged from said image formation unit, is loaded.

5. An image processing device according to claim 1, further comprising an image reading section which reads an image from a document and acquires image data; and wherein said input keys receive input operation for controlling said image reading section.

6. An image processing device according to claim 1, wherein:
   said processing section is an image reading section which reads an image from a document and acquires image data; and
   said load section includes a document discharge tray upon which a document, an image upon which has been read by said image reading section, is loaded.

7. An image processing device according to claim 6, wherein said load section includes a document load tray upon which a document, an image upon which is to be read by said image reading section, is loaded.

8. An image processing device according to claim 6, wherein said operating section, in its said pulled out position, is disposed directly above said document discharge tray.

9. An image processing device according to claim 7, wherein said operating section, in its said pulled out position, is disposed directly above said document load tray.

10. An image processing device according to claim 7, wherein said operating section, in its said pulled out position, is disposed above said document discharge tray and said document load tray.

* * * * *